(12) United States Patent
Yang et al.

(10) Patent No.: US 9,441,079 B2
(45) Date of Patent: Sep. 13, 2016

(54) BLOCK COPOLYMER COMPRISING POLYORGANOSILOXANE BLOCK AND POLYOLEFIN BLOCK

(71) Applicant: 3M INNOVATIVE PROPERTIES COMPANY, St. Paul, MN (US)

(72) Inventors: Yu Yang, Eden Prairie, MN (US); Shilpi K. Sanghi, St. Paul, MN (US); Suresh Iyer, Woodbury, MN (US); Yongshang Lu, Woodbury, MN (US)

( * ) Notice: Subject to any disclaimer, the term of this patent is extended or adjusted under 35 U.S.C. 154(b) by 0 days.

(21) Appl. No.: 14/426,998

(22) PCT Filed: Nov. 19, 2013

(86) PCT No.: PCT/US2013/070663
§ 371 (c)(1),
(2) Date: Mar. 10, 2015

(87) PCT Pub. No.: WO2014/081682
PCT Pub. Date: May 30, 2014

(65) Prior Publication Data
US 2015/0247007 A1  Sep. 3, 2015

Related U.S. Application Data

(60) Provisional application No. 61/728,504, filed on Nov. 20, 2012.

(51) Int. Cl.
*C09D 183/06* (2006.01)
*C08G 81/02* (2006.01)
*C08G 77/442* (2006.01)
*C08G 77/26* (2006.01)

(52) U.S. Cl.
CPC ........... *C08G 81/024* (2013.01); *C08G 77/442* (2013.01); *C08G 77/26* (2013.01); *C09D 183/06* (2013.01)

(58) Field of Classification Search
None
See application file for complete search history.

(56) References Cited

U.S. PATENT DOCUMENTS

| | | | |
|---|---|---|---|
| 2,532,011 A | 11/1950 | Dahlquist | |
| RE24,906 E | 12/1960 | Ulrich | |
| 3,389,827 A | 6/1968 | Abere | |
| 3,445,389 A | 5/1969 | McKellar | |
| 3,573,334 A * | 3/1971 | Wheeler, Jr. | C08F 8/42 204/157.64 |
| 3,645,835 A | 2/1972 | Hodgson | |
| 4,112,213 A | 9/1978 | Waldman | |
| 4,310,509 A | 1/1982 | Berglund | |
| 4,323,557 A | 4/1982 | Rosso | |
| 4,386,179 A | 5/1983 | Sterling | |
| 4,595,001 A | 6/1986 | Potter | |
| 4,737,410 A | 4/1988 | Kantner | |
| 5,088,483 A | 2/1992 | Heinecke | |
| 5,160,315 A | 11/1992 | Heinecke | |
| 5,214,119 A | 5/1993 | Leir | |
| 5,229,179 A | 7/1993 | Kumar | |
| 5,346,951 A * | 9/1994 | Suwada | C08G 77/442 525/64 |
| 5,531,855 A | 7/1996 | Heinecke | |
| 5,622,711 A | 4/1997 | Chen | |
| 5,633,010 A | 5/1997 | Chen | |
| 5,641,835 A | 6/1997 | Smith | |
| 5,670,598 A | 9/1997 | Leir | |
| 5,744,541 A * | 4/1998 | Sawaguchi | C08G 81/024 524/588 |
| 5,959,032 A * | 9/1999 | Evans | C08F 8/30 524/504 |
| 6,264,976 B1 | 7/2001 | Heinecke | |
| 6,355,759 B1 | 3/2002 | Sherman | |
| 7,247,385 B1 * | 7/2007 | Tzoganakis | C08F 8/42 428/426 |
| 7,943,120 B2 | 5/2011 | Toyoda | |
| 8,080,622 B2 | 12/2011 | Fujisawa | |
| 2002/0187326 A1 | 12/2002 | Kong | |
| 2009/0318629 A1* | 12/2009 | Adoni | C08L 69/00 525/431 |
| 2010/0318052 A1 | 12/2010 | Ha | |
| 2015/0030796 A1 | 1/2015 | Boardman | |

FOREIGN PATENT DOCUMENTS

| | | |
|---|---|---|
| CH | 505196 | 3/1971 |
| EP | 0254050 | 1/1988 |
| EP | 0507459 | 10/1992 |
| JP | S62-95337 | 5/1987 |
| JP | S63-101428 | 5/1988 |
| JP | H07-002915 | 1/1995 |
| JP | H07-258358 | 10/1995 |
| WO | WO 95-02642 | 1/1995 |
| WO | WO 96-30426 | 10/1996 |
| WO | WO 2009-073901 | 6/2009 |
| WO | WO 2012-103080 | 8/2012 |
| WO | WO 2014-081626 | 5/2014 |

OTHER PUBLICATIONS

McGrath, "Synthesis and Characterization of Segmented Siloxane Copolymers", American Chemical Society, Mar. 1998, vol. 39, No. 1, pp. 455-456.
Tanigawa, "Characterization of Thermo-Responsive Poly [N—(2-Hydroxypropyl) Methacrylamide-Dimethylsiloxane] Block Copolymers", Journal of the Society of Materials Science, Japan; Apr. 2006, vol. 55, No. 4, pp. 391-396.
International Search Report for PCT International Application No. PCT/US2013/070663, mailed on Apr. 16, 2014, 4pgs.

* cited by examiner

*Primary Examiner* — Robert S Loewe

(57) ABSTRACT

Presently described are block copolymers suitable for use as a low adhesion backsize ("LAB") coating. The block copolymers comprise at least one polyorganosiloxane block and at least one polyolefin block. The polyolefin block is semi-crystalline having a melt point of at least 110° C. The block copolymer typically has the structure: $A[\text{-L-B}]_n$ wherein A is a polyorganosiloxane block and B is a polyolefin block. L is a covalent bond or a divalent linking group. In some embodiments, L is the reaction product of an amine or hydroxyl and an anhydride.

17 Claims, No Drawings

BLOCK COPOLYMER COMPRISING POLYORGANOSILOXANE BLOCK AND POLYOLEFIN BLOCK

CROSS REFERENCE TO RELATED APPLICATIONS

This application is a national stage filing under 35 U.S.C. 371 of PCT/US2013/070663, filed Nov. 19, 2013, which claims priority to U.S. Provisional Application No. 61/728,504, filed Nov. 20, 2012, the disclosure of which is incorporated by reference in their entirety herein.

FIELD

The invention relates to polyorganosiloxane block copolymer materials.

SUMMARY

In one embodiment, a block copolymer is described having the general structure:

A[-L-B]$_n$ wherein n is at least 1,
A is the polyorganosiloxane block,
B is the polyolefin block, and
L is a covalent bond or a divalent linking group comprising the reaction product of an amine or alcohol and an anhydride.

In some embodiments, the polyolefin block has a melt point of at least 110° C. The polyolefin block may comprise a polypropylene homopolymer or copolymer.

DETAILED DESCRIPTION

Presently described are block copolymers suitable for use as a low adhesion backsize ("LAB") coating. The block copolymers comprise at least one polyorganosiloxane block and at least one polyolefin block. The polyolefin block is semi-crystalline having a melt point of at least 110° C.

The block copolymer typically has the structure:

A[-L-B]$_n$ wherein A is a polyorganosiloxane block and B is a polyolefin block. L is a covalent bond or a divalent linking group. In some favored embodiments, L is the reaction product of an amine or hydroxyl and an anhydride.

In some embodiments, n is 1, and the block copolymer can be characterized as having a linear diblock (A-B) structure. In other embodiments, n is 2 and the block copolymer can be characterized as having a linear triblock (B-A-B) structure wherein B are polyolefin endblocks and A is the polyorganosiloxane midblock. In yet other embodiments, n is 3 or greater, and the block copolymer may be characterized as a grafted block copolymer. The grafted block copolymer typically comprises a polyorganosiloxane backbone A and polyolefin side chains. The grafted copolymer may optionally further comprise polyolefin end block(s).

The polyolefin block preferably comprises a semi-crystalline polyolefin homopolymer or copolymer having a melt point of at least 110° C., 115° C., or 120° C. Polyethylene and especially polypropylene polymers are preferred in few of their relatively high melting point as a result of having a relatively high level of crystallinity. The melting of polypropylene occurs over a range. Thus, the melting point is determined by finding the highest temperature as measured according to differential scanning calorimetry.

Medium— and high-density polyethylene has a melting point in the range 120 to 130° C. (248 to 266° F.). In some embodiments, the polyolefin block has a melting point of at least 120° C., as can be provided from syndiotactic polypropylene (having a crystallinity of 30%) and a melting point of 130° C. Polypropylene that is predominantly isotactic typically has a melting point that ranges from 160 to 166° C. (320 to 331° F.). In some embodiments, the polyolefin block has a melting point of at least 130° C., 135° C., 140° C., 145° C., 150° C., 155° C. or 160° C. Polypropylene having such melting point may comprise a combination of syndiotactic and isotactic repeat units. In yet other embodiments, the polyolefin block has a melting point of at least 165° C. or 170° C., as can be provided by 100% isotactic polypropylene having a melting point of 171° C. (340° F.).

In yet other embodiments, the polyolefin block is a copolymer of polyethylene and polypropylene copolymer. For example, a random copolymer of polyethylene and predominantly isotactic polypropylene has a melting point between the melting point of a polyethylene homopolymer and isotactic polypropylene. In some embodiments, the polyolefin copolymer comprises repeat units derived from ethylene and/or propylene and one or more other saturated or unsaturated $C_4$-$C_{12}$ olefin comonomers. When the comonomer is saturated, the crystalline polyolefin block may be characterized as a polyalkylene copolymer. When the comonomer is unsaturated, the polymer may be characterized as a polyalkene copolymer.

Unless specified otherwise, throughout the application "molecular weight" refers to the number average molecular weight. The molecular weight of the polyorganosiloxane block is typically at least 500 g/mole, 600 g/mole, 700 g/mole, or 800 g/mole. The molecular weight of the polyorganosiloxane block is typically no greater than 150,000 g/mole or 100,000 g/mole. In some embodiments, the molecular weight of the polyorganosiloxane block is at least 900 g/mole or 1000 g/mole and may range up to 5,000 g/mole. In other embodiments, the molecular weight of the polyorganosiloxane block is at least 2000 g/mole or 3000 g/mole or 4000 g/mole or 5000 g/mole and may range up to 25,000 g/mole. In yet other embodiments, the molecular weight (Mn) of the polyorganosiloxane block is at least 10,000 g/mole or 15,000 g/mole or 20,000 g/mole or 25,000 g/mole.

The molecular weight of the (e.g. polypropylene) polyolefin block is also typically at least 500 g/mole, 600 g/mole, 700 g/mole, or 800 g/mole. In some embodiments, the molecular weight of the (e.g. polypropylene) polyolefin block is at least 1500 or 2000 g/mole. In some embodiments, the molecular weight of the (e.g. polypropylene) polyolefin block is at least 3000, 4000, or 5000 g/mole. In some embodiments, the molecular weight of the (e.g. polypropylene) polyolefin block is no greater than 50,000 g/mole, 40,000 g/mole, 30,000 g/mole or 20,000 g/mole. When the polyolefin block is a polypropylene homopolymer the number of repeats is about 24 to obtain a molecular weight of about 1,000 g/mole. However, when the polyolefin block is a polypropylene copolymer and the comonomer has greater than 3 carbon atoms, the number of repeat units may be lower. The polyolefin block is generally a homopolymer or copolymer comprising at least 5, 6, 7, 8, 9, or 10 total repeat units.

The molecular weight of the block copolymer is generally equal to the sum of the molecular weight of the blocks. Generally the polyorganosiloxane and polyolefin materials are selected such that the block copolymer has a molecular weight of at least 1,000 g/mole; 1,500 g/mole; or 2,000 g/mole and no greater than 250,000 g/mole. In some embodiments, the molecular weight of the block copolymer is no greater than 200,000 g/mole, 150,000 g/mole, or 100,000 g/mole.

When the block copolymer is a diblock (and both blocks have the same molecular weight), the block copolymer typically comprises about 50 wt.-% polyorganosiloxane. In some embodiments, the block copolymer comprises less than 50 wt.-% polyorganosiloxane. For example, when the block copolymer is a triblock (and both blocks have the same molecular weight), the block copolymer typically comprises about 33 wt.-% polyorganosiloxane. In yet another embodiment, a graft copolymer may comprise a polyorganosiloxane backbone and polyolefin graft(s) wherein the polyolefin graft(s) have a molecular weight 2, 3, 4, 5, or 6 times that of the polyorganosiloxane. The minimum amount of polyorganosiloxane is typically at least 15 wt-% of the total weight of the block copolymer. Block copolymer having at least 45 or 50 or 55 wt-% polyolefin are favorable for heat sealing. High concentrations of polyolefin can also be amenable to reducing cost of the block copolymer.

In other embodiments, the block copolymer comprises greater than 50 wt.-% polyorganosiloxane. This can be achieved when the polyorganosiloxane block has a significantly higher molecular weight than the polyolefin block. The maximum amount of polyorganosiloxane is typically at least 75 wt-% of the total weight of the block copolymer. Block copolymers having higher concentrations of polyorganosiloxane can provide better release properties.

In some embodiments, the block copolymers can be prepared by reacting an amine- or hydroxyl-functional polyorganosiloxane with an anhydride-functional polyolefin block. In other words the polyorganosiloxane block and polyolefin block are linked by the reaction product of an amine or hydroxyl group with an anhydride.

The amine-functional polyorganosiloxane can be prepared by a variety of methods. Methods of synthesizing such materials is described in U.S. Pat. Nos. 5,214,119 and 6,355,759.

Various amine-functional polyorganosiloxane materials are commercially from Gelest Inc., Morrisville Pa.; Wacker Chemie AG, Munich Germany; and Genesse Polymer Corporation, Burton, Mich. Hydroxy-functional polyorganosiloxane (e.g. diol) materials are also commercially available from Gelest Inc.

The amine groups of the amine-functional polyorganosiloxane are primary, secondary, or a combination thereof.

Anhydride-functional polyolefins can be prepared by a free radical reaction of maleic anhydride with polyolefin.

Anhydride-functional polypropylene polymers are commercially available from Baker Hughes, Polymer Division, Send Springs, Okla. under the trade designations "PP-X-10081", "PP-X-10082", "PP-X-10065", and "PP-X-10053".

The anhydride functional group of the polyolefin is typically a succinic anhydride or a derivative thereof.

Succinic anhydride-functional polyolefins can be represented by the formula:

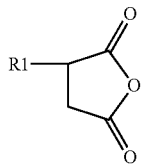

wherein $R^1$ is a polyolefin polymer having a melt point of at least 110° C.

For embodiments wherein the block copolymer is a diblock copolymer comprising a single polyorganosiloxane block and a single (e.g. polypropylene) polyolefin block, a monofunctional (e.g. amine or hydroxyl) polyorganosiloxane can be reacted with a mono-anhydride (e.g. polypropylene) polyolefin. The diblock copolymer can be represented by the following formula:

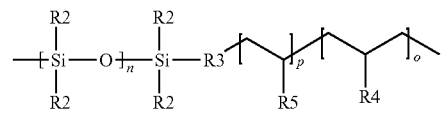

wherein R2 is hydrogen, C1-C6 alkyl or nitrile;

n is the number of siloxane repeat unit,

R3 is the reaction product of an amine or hydroxyl functional group and an anhydride functional group;

p is the number of polyethylene and/or polypropylene repeat units;

for each m, R5 is independently hydrogen (i.e. ethylene repeat unit) or methyl (i.e. propylene repeat unit) R4 is a C1-C8 alkylene or alkene; and o is the number of saturated alkylene of unsaturated alkene repeat units independently having 4 to 12 carbon atoms.

R2 is most typically methyl. The number of siloxane repeat units, n, is greater than 1 and is a value such that the polyorganosiloxane block has the molecular weight ranges previously described. The number of polyethylene and/or polypropylene repeat units, p, is typically at least 5, 6, 7, 8, 9, or 10 as previously described. In some embodiments, o is zero and the polyolefin block is a polypropylene or polyethylene homopolymer. In other embodiments, n is at least 1, or greater than 1, such as 2, 3, 4, or 5. The number of comonomer repeat units is typically less than or equal to the number of polyethylene and polypropylene repeat units. In some embodiments, the divalent linking group, R3, independently has one of the following structures:

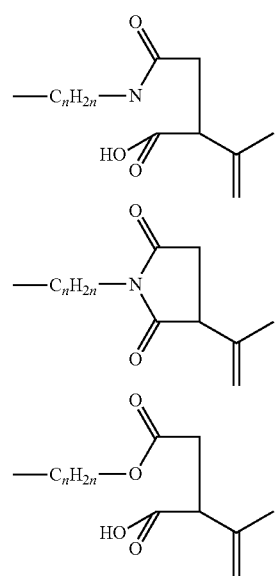

A diblock copolymer can also be prepared by hydrosilylation reaction of a double bond terminated polyolefin with a polyorganosiloxane polymer having a terminal hydride.

The diblock copolymer can be represented by the following formula:

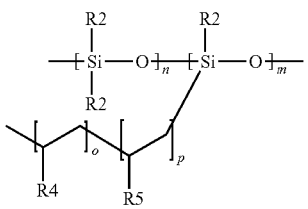

wherein R2, R4, R5, n, o, and p are the same as previously described and m is the number of siloxane groups having a polyolefin graft.

For embodiments wherein the block copolymer is a linear triblock copolymer comprising a polyorganosiloxane midblock and (e.g. polypropylene) polyolefin endblocks, a polyorganosiloxane diamine or diol can be reacted with a mono-anhydride (e.g. polypropylene) polyolefin. The triblock copolymer can be represented by the following formula:

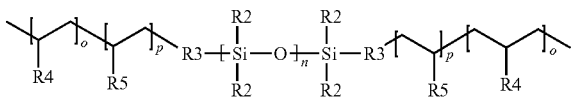

wherein R2, R3, R4, R5, n, o, and p are the same as previously described.

For embodiments wherein the block copolymer is a graft copolymer comprising a polyorganosiloxane backbone and (e.g. polypropylene) polyolefin side chain, a polyorganosiloxane comprising one or more pendant amines or hydroxyls can be reacted with a mono-anhydride (e.g. polypropylene) polyolefin. The grafted copolymer can be represented by the following formula:

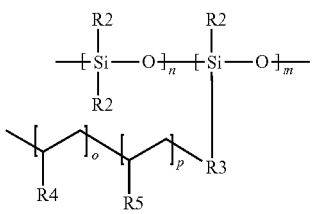

wherein R2, R3, R4, R5, n, o, and p are the same as previously described and m is the number of siloxane groups having a polyolefin graft.

Regardless of the reaction scheme, the reactions are conducted in a dry (i.e. non-aqueous) solvent, or mixtures of solvents, protected from atmospheric moisture. The solvents are unreactive with the functional groups of the starting materials. The starting materials and final products typically remain completely miscible in the solvents during and after completion of the polymerization. Suitable solvents include polar liquids, such as alcohols, ethers, esters, and chlorinated hydrocarbons, with tetrahydrofuran and methylene chloride being especially useful. Solvents are determined by the nature of the reagents. Secondary alcohols, such as isopropanol or 2-butanol, are typically utilized, either alone, or in combination with non-polar solvents such as toluene or cyclohexane.

The block copolymer composition may optionally comprise suitable additives such as pigments, dyes, and fillers. Particularly when the block copolymer composition is utilized on an industrial tape or label article, light stabilizing compound are commonly added.

The polyorganosiloxane block copolymer compositions described herein, depending upon their viscosity, can be coated via any of a variety of conventional coating methods, such as roll, knife, or curtain coating, or (e.g. hot melt) extrusion coating. When the block copolymer composition is applied as a solvent-based coating, the coating is dried after application.

The (solvent-less) coated block copolymer composition typically has a thickness of at least 50 nm or 100 nm (0.1 microns) and no greater than 20 mils. In some embodiments, the thickness is at least 0.5, 1 or 2 microns and no greater than 50, 40, 30, 20, or 10 microns.

The block copolymers of the present invention are suitable for use as low adhesion backsize (LAB) coatings. In some embodiments, the low adhesion backsize (LAB) coating comprises the described block copolymer in the absence of adhesion adjusting components such as tackifiers, plasticizers, and waxes. In other embodiments, the bock copolymer compositions comprises up to 5, 10 or 15 wt-% of such adhesion adjusting components.

Low adhesion backsize coating are typically applied to an exposed surface of a planar surface such as a nonwoven or polymeric film substrate. In some embodiments, the low adhesion backsize coating improves the slip or in other-words reduces the friction as compared to the backing substrate in the absence of such coating. In some embodiments, the coefficient of friction is reduced by 20%, 30%, 40%, 50%, 60%, 70% or 80% as compared to the substrate in the absence of such coating. The coefficient of friction can be less than 0.4, or 0.35, or 0.3, or 0.25, or 0.20. In some embodiments, the coefficient of friction is at least 0.02 or 0.05 or 0.10.

In some embodiments, low adhesion backsize (LAB) coating is utilized on an (e.g. intermediate) laminate or article that further comprise a pressure sensitive adhesive, such as tapes, labels and other types of PSA-coated sheets. Some embodiments of such articles utilizing a polyvinyl carbamate LAB coating are described in U.S. Pat. No. 2,532,011; incorporated herein by reference. The LAB-coated surface provides a surface to which the adhesive does not permanently adhere, so that the adhesive releases therefrom prior to use.

A backing substrate having a LAB is particularly useful for providing an adhesive article such as a tape in roll form. In this case, adhesive is coated onto the side of the backing substrate opposite the LAB so that when the adhesive coated backing substrate is rolled, the adhesive contacts the LAB. The adhesive adheres well enough to the LAB so that the roll does not come undone or "telescope", yet not so well that the tape cannot be unrolled.

The block copolymers of this invention may be prepared to give varying amounts of release through variations in the molecular weight (Mn) of the polyorganosiloxane and polyolefin blocks as well as the number of each block of the block copolymer structure. In general, the amount of release can vary from 1.0 N/dm or less to about 35 N/dm. LABs for tapes in roll form typically exhibit release values in the range of from about 6 to about 35 N/dm.

As the concentration of polyorganosiloxane increases the release values can decrease. For premium release coatings (i.e., release coatings having release values of less than about 2 N/dm), a higher content of polyorganosiloxane is required in the formulation, e.g. from about 25 to 50 percent by weight polyorganosiloxane. In applications where moderate release values are acceptable, the polysiloxane content may be reduced to lower levels, for example, 15% by weight and lower.

Regardless of whether the composition is intended to reduce the coefficient of friction of the substrate to which it is applied and/or release from a pressure sensitive adhesive, the block copolymer compositions can be applied to at least a portion of at least one major surface of a suitable flexible or inflexible backing substrate material and dried to produce low adhesion sheet materials. Useful flexible backing substrate materials include paper, plastic films such as poly(propylene), poly(ethylene), poly(vinyl chloride), poly(tetrafluoroethylene), polyurethane, polyester (e.g., poly(ethylene terephthalate)), polyimide film, cellulose acetate, and ethyl cellulose. Backing substrates can also be of woven fabric formed of threads of synthetic or natural materials such as cotton, nylon, rayon, glass, or ceramic material, or they can be of nonwoven fabric such as air-laid webs of natural or synthetic fibers or blends of these. In addition, suitable backing substrates can be formed of metal, metallized polymeric film, or ceramic sheet material.

The backing substrate may optionally comprise a primer or tie layer disposed between the substrate and low adhesion coating comprising the block copolymer described herein.

The thickness of the backing substrate is typically no greater than 200, or 100, or 50, or 25 µm. The thickness is typically at least 15 µm.

The coated sheet materials can take the form of any article conventionally known to be utilized with PSA compositions, such as labels, tapes, transfer tapes (comprising a film of the PSA borne on at least one release liner), signs, marking indices, as well as medical or wound dressings.

This invention is further illustrated by the following examples which are not intended to be limiting in scope. Unless indicated otherwise, the molecular weights refer to number average molecular weights. All parts, percentages and ratios are by weight unless otherwise specified.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

Materials

Unless otherwise noted, all parts, percentages, ratios, etc., in the examples and in the remainder of the specification are by weight. Unless otherwise noted, all chemicals were obtained or are available from, chemical suppliers such as Aldrich Chemical Company, Milwaukee, Wis.

| Designation | Description | Supplier |
|---|---|---|
| HMS-064 | Methylhydrosiloxane-dimethylsiloxane copolymer $M_n$ = 55K-65K | Gelest Inc., Morrisville, PA |
| PP-X-10081 | Polypropylene terminated with double bond Mn = 8000 | Baker Hughes, Polymer Division, Send Springs, OK |
| PP-X-10065 | Polypropylene terminated with anhydride, Mn = 1178 | Baker Hughes, Polymer Division, Send Springs, OK |
| PP-X-10082 | Polypropylene terminated with anhydride, Mn = 6418 | Baker Hughes, Polymer Division, Send Springs, OK |
| PP-X-10053 | PP copolymerized with 1-hexylene and terminated with anhydride, Mn = 2654 | Baker Hughes, Polymer Division, Send Springs, OK |
| WACKER FLUID NH 130D | Polydimethylsiloxane diamine, Mw = 11496 | Wacker Chemie AG, Münich, Germany |
| DMS-C21 | Polydimethylsiloxane diol, Mn = 1178 | Gelest Inc., Morrisville, PA |
| GP-4 | Polydimethylsiloxane multi-amine, equivalent Mn = 1182.03 | Genesee Polymers Corporation, Burton, MI |
| MCR-A11 | Monoaminopropyl terminated Polydimethylsiloxane Mn = 900 | Gelest Inc., Morrisville, PA |
| SIP 6831.2 | Platinum-divinyl tetramethyl disilaxane complexes in xylene | Gelest Inc., Morrisville, PA |
| ESTANE 58237 | Ether based polyurethane film, 0.9-1.1. mil (22.9 micrometers-27.9 micrometers) thick | Lubrizol Corporation, Cleveland, OH |

Test Methods
Method for Determining Static and Kinetic Coefficient of Friction

The static and kinetic coefficients of friction (S-COF and K-COF, respectively) of the coated films (prepared in examples described below) were tested against 100% cotton sheets according to the ASTM D1894 08 (Standard test method for static and kinetic coefficients of friction of plastic film and sheeting, Rev. 11 (2011), obtained from HIS Inc., Englewood, Colo.) except that the test specimen was attached to the sled and cotton sheet was attached to the plane.

Method for Determining Heat Sealing Compatibility

A carrier was heat sealed to the coated backing substrate using a pressure of 50 psi. The carrier was a (78#) paper substrate having a silicone release side and a polyethylene coated side. The polyethylene side of the carrier was contacted with the dried block copolmyer LAB coating of the backing substrate when heat sealed. The dwell time (in seconds) and heat seal temperature were recorded and are reported in the table below.

Method for Determining Moisture Vapor Transmission Rate (MVTR)

Upright MVTR

The upright MVTR was measured according to ASTM E96-80 using a modified Payne cup method. A 3.8 cm diameter sample was placed between adhesive-containing surfaces of two foil adhesive rings, each having a 5.1 cm² elliptical opening. The holes of each ring were carefully aligned. Finger pressure was used to form a foil/sample/foil assembly that was flat, wrinkle free, and had no void areas in the exposed sample.

A 120 mL glass jar was filled with approximately 50 g of tap water that contained a couple drops of 0.02% (w/w) aqueous Methylene Blue USP (Basic Blue 9, C.I. 52015) solution, unless specifically stated in an example. The jar was fitted with a screw-on cap having a 3.8 cm diameter hole in the center thereof and with a 4.45 cm diameter rubber washer having an approximately 3.6 cm hole in its center The rubber washer was placed on the lip of the jar and foil/sample/foil assembly was placed backing side down on the rubber washer. The lid was then screwed loosely on the jar.

The assembly was placed in a chamber at 40 C. and 20% relative humidity for four hours. At the end of four hours, the cap was tightened inside the chamber so that the sample was level with the cap (no bulging) and the rubber washer was in proper seating position.

The foil sample assembly was removed from the chamber and weighed immediately to the nearest 0.01 gram for an initial dry weight, W1. The assembly was then returned to the chamber for at least 18 hours, the exposure time T1 in hours, after which it was removed and weighed immediately to the nearest 0.01 g for a final dry weight, W2. The MVTR in grams of water vapor transmitted per square meter of sample area per 24 hours can then be calculated using the following formula.

Upright (Dry) MVTR=(W1-W2)*(4.74*104)/T1

Inverted MVTR

The inverted MVTR was measured using the following test procedure. After obtaining the final "dry" weight, W2, as described for the upright MVTR procedures, the assembly was returned to the chamber for at least 18 additional hours of exposure time, T2, with the jars inverted so that the tap water was in direct contact with the test sample. The sample was then removed from the chamber and weighed to the nearest 0.01 gram for a final wet weight, W3. The inverted wet MVTR in grams of water vapor transmitted per square meter of sample area per 24 hours can then be calculated using the following formula.

Inverted (Wet) MVTR=(W2-W3)*(4.74*104)/T2

Preparative Example 1 (PE1)

Silicone diamine (WACKER FLUID NH 130 D, Mn=11496, 11.5 g), polypropylene (PP-X-10082, Mn=6418, 12.84 g), and p-xylene (30 g) were charged into a flask. The solution was refluxed for 0.5 hour in an oil bath at 130° C. Evaporation of solvent at 120° C. gave solid powder (tri-block material) according to the reaction scheme below.

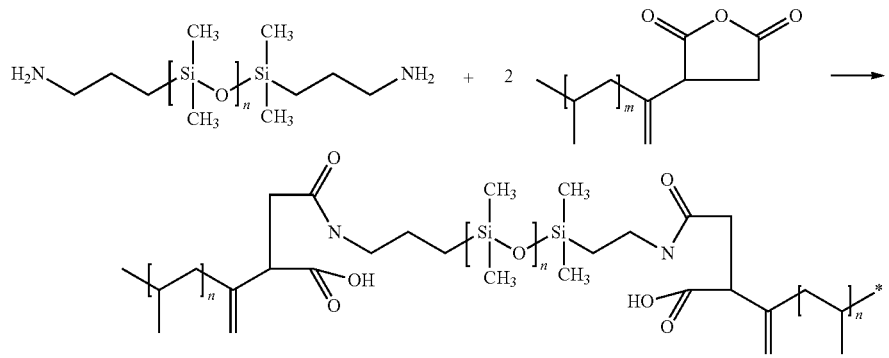

Preparative Example 2 (PE2)

Silicone diamine (WACKER FLUID NH 130 D, Mn=11496, 11.5 g), polypropylene (PP-X-10082, Mn=6418, 12.84 g), p-xylene (30 g) and isoquinoline (0.04 g) were charged into a flask. The solution was refluxed for 8 hours azeotropically to take out water in an oil bath at 130° C. Evaporation of solvent at 120° C. gave solid powder (tri-block material) according to the reaction scheme below.

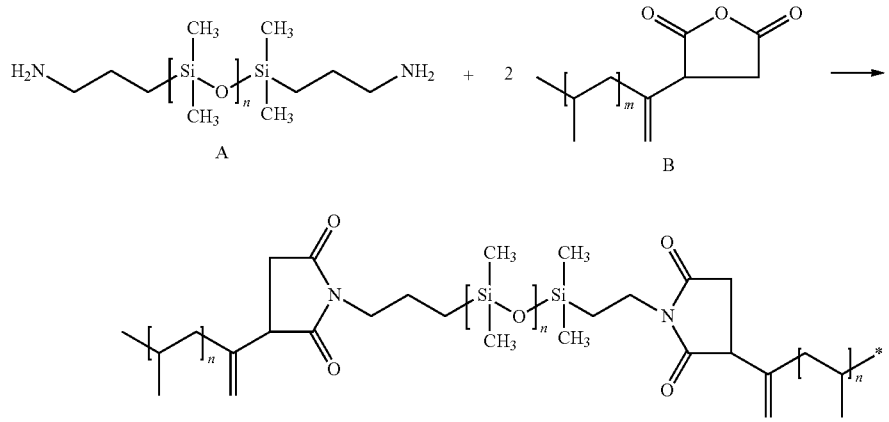

Preparative Example 3 (PE3)

Silicone diamine (WACKER FLUID NH 130 D, Mn=11496, 11.5 g), polypropylene (PP-X-10053, Mn=2654, 5.3 g), and p-xylene (30 g) were charged into a flask. The solution was refluxed for 0.5 hours in an oil bath at 130° C. Evaporation of solvent at 120° C. gave solid powder (tri-block material) according to the reaction scheme below.

Preparative Example 5 (PE5)

Silicone diol (DMS-C21, Mn=5000, 50 g), polypropylene (PP-X-10065, Mn=1178, 23.56 g), p-xylene (80 g) were charged into a flask. The solution was refluxed for 0.5 hours in an oil bath at 130° C. Evaporation of solvent at 120° C. gave solid powder (tri-block material) according to the reaction scheme below.

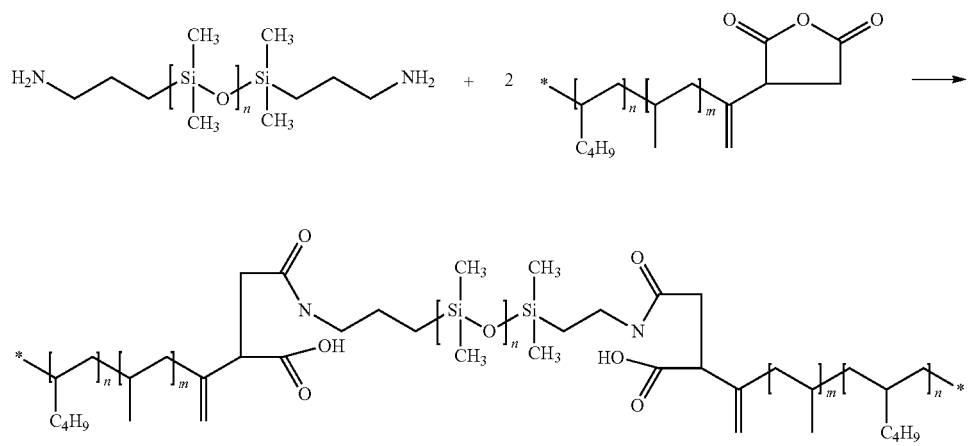

Preparative Example 4 (PE4)

Silicone diamine (WACKER FLUID NH 130 D, Mn=11496, 11.5 g), polypropylene (PP-X-10053, Mn=2654, 5.3 g), p-xylene (30 g) and isoquinoline (0.04 g) were charged into a flask. The solution was refluxed for 8 hours azeotropically to take out water in an oil bath at 130° C. Evaporation of solvent at 120° C. gave solid powder (tri-block material) according to the reaction scheme below.

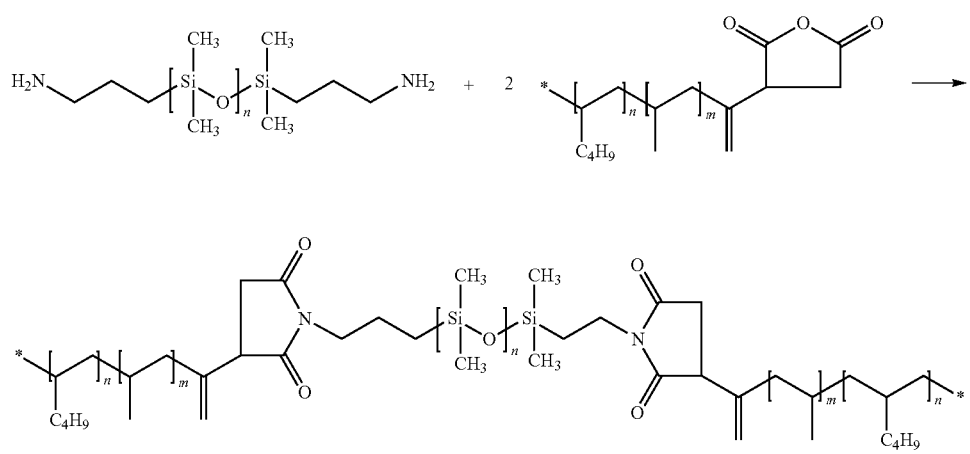

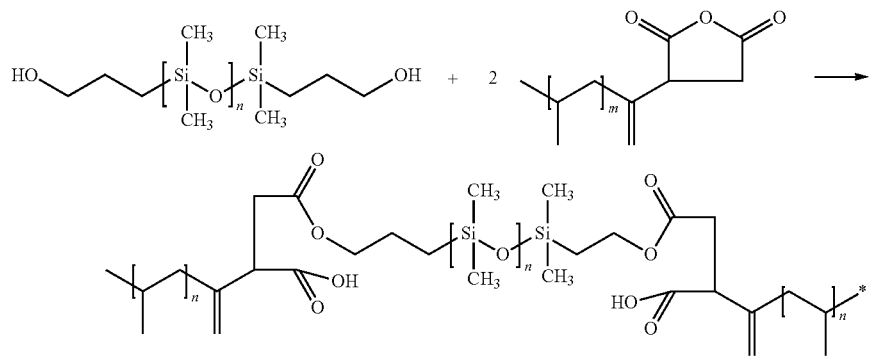

Preparative Example 6 (PE6)

Silicone monoamine (MCR-A11, Mn=900, 9 g), polypropylene (PP-X-10082, Mn=6418, 64.18 g), and p-xylene (300 g) were charged into a flask. The solution was refluxed for 0.5 hour in an oil bath at 130° C. Evaporation of solvent at 120° C. gave solid powder (di-block material) according to the reaction scheme below.

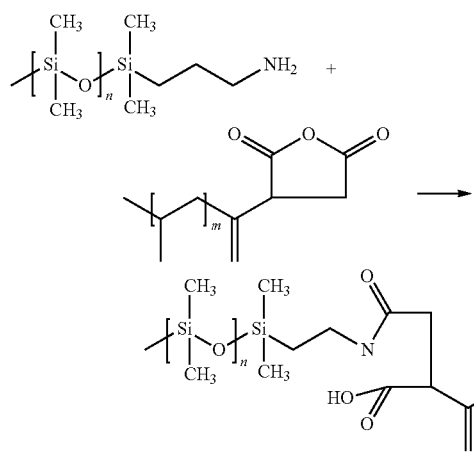

Preparative Example 7 (PE7)

Silicone monoamine (MCR-A11, Mn=900, 9 g), polypropylene (PP-X-10082, Mn=6418, 64.18 g), and p-xylene (300 g) and isoquinoline (0.04 g) were charged into a flask. The solution was refluxed for 8 hours azeotropically to take out water in an oil bath at 130° C. Evaporation of solvent at 120° C. gave solid powder (di-block material) according to the reaction scheme below.

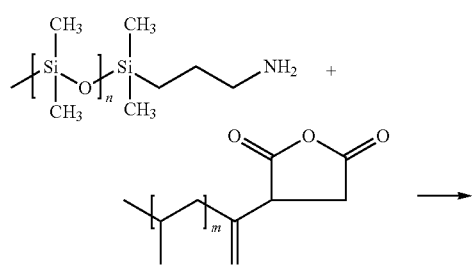

-continued

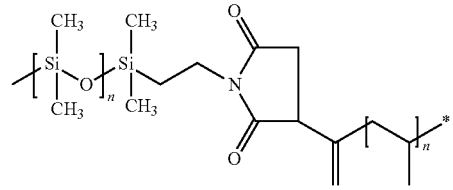

Preparative Example 8 (PE8)

Silicone multiamine (GP-4, equivalent Mn=1182.03, 11.82 g), polypropylene (PP-X-10082, Mn=6418, 64.18 g), and p-xylene (100 g) were charged into a flask. The solution was refluxed for 0.5 hour in an oil bath at 130° C. Evaporation of solvent at 120° C. gave solid powder (multi-block material) according to the reaction scheme below.

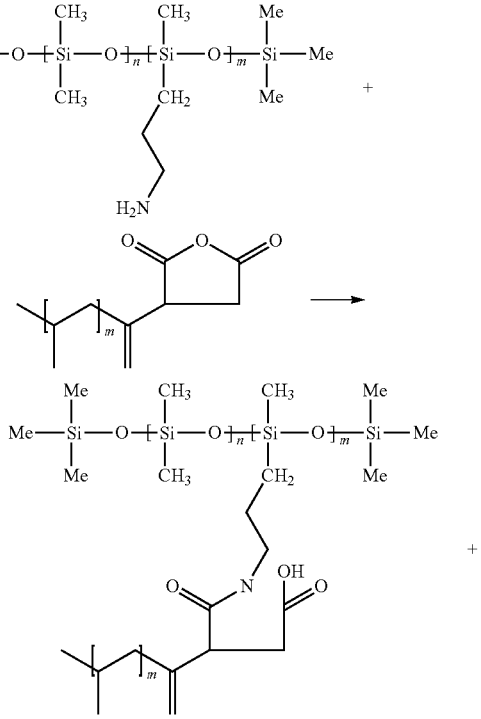

Preparative Example 9 (PE9)

Silicone multiamine (GP-4, equivalent Mn=1182.03, 11.82 g), polypropylene (PP-X-10082, Mn=6418, 64.18 g), and p-xylene (100 g) and isoquinoline (0.04 g) were charged into a flask. The solution was refluxed for 8 hours azeotropically to take out water in an oil bath at 130° C. Evaporation of solvent at 120° C. gave solid powder (multi-block material) according to the reaction scheme below, wherein m is more than 1.

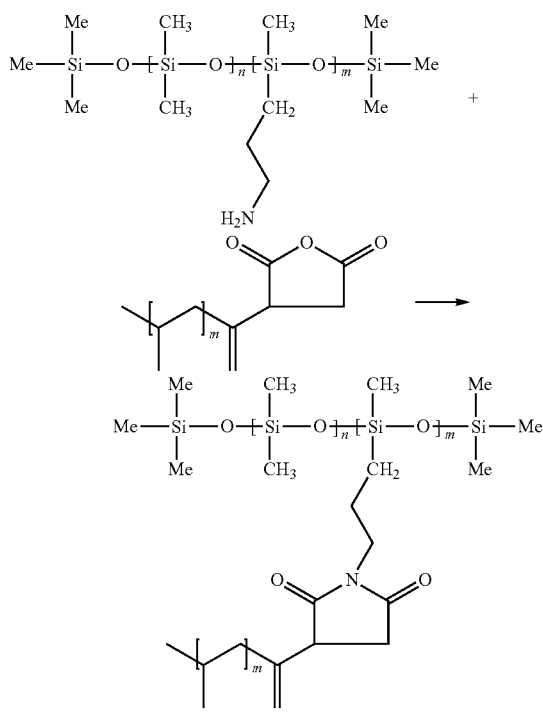

Preparative Example 10 (PE10)

Polypropylene (PP-X-10081, 3 g) and xylene (30 g) were mixed in a flask and heated until complete dissolution. The solution was cooled down and then Pt catalyst (SIP 6831.2, 0.02 g) and silicone (HMS-064 $M_n$=55K-65K, 3 g) were added. The solution was heated to 80° C. for 66 hours. Evaporation of solvent at 120° C. gave about 5.8 g of a solid powder (multi-block silicone with polypropylene side chain) according to the reaction scheme below.

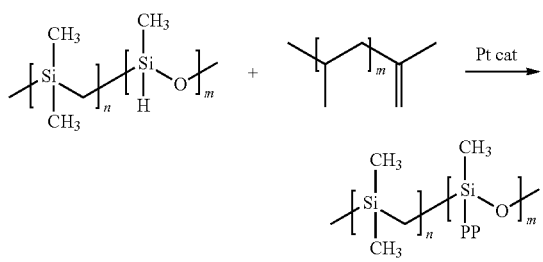

Examples 1-4 (EX1-EX4) and Comparative Examples 1-2 (CE1-CE2)

First, 5 g of a tri-block polymer (prepared as described above in PE1) was dissolved in 95 g of xylene. The tri-block polymer contained 46 wt. % of silicone, and the coating solution contained 5 wt. % of the tri-block polymer. The resulting solution was then coated on ESTANE 58327 ether-based polyurethane films using a 3# Meyer bar. The resulting coated films were then dried in an oven at specified temperatures for specified time to prepare the coated films of EX1-EX4. Table 1, below summarizes the drying temperature and times used for preparing each of EX1-EX4 samples. The dried coating had a thickness of 2 microns.

CE1 was uncoated ESTANE 58327 ether based polyurethane film. CE2 was a 3M TEGADERM HP TRANSPARENT DRESSING commercially available from 3M Company, St. Paul, Minn. under trade designation "3M TEGADERM HP TRANSPARENT DRESSING".

TABLE 1

| Example | Block Copolymer | Drying temperature (° C.) | Drying time (minutes) |
|---|---|---|---|
| EX1 | PE1 | 110 | 2 |
| EX2 | PE1 | 120 | 2.5 |
| EX3 | PE1 | 130 | 2.5 |
| EX4 | PE1 | 140 | 2.5 |

EX1-EX4 and CE1-CE2 samples were then tested for their breathability (i.e., MVTR), static and kinetic coefficients of friction, and heat seal compatibility and the data are summarized in Table 2, below.

TABLE 2

| Example | K-COF | Upright MVTR (grams/m²/ 24 hours) | Inverted MVTR (grams/m²/ 24 hours) | Conditions for Heat Seal of Carrier (seconds @ ° C.) |
|---|---|---|---|---|
| CE1 | 0.653 | 3243 | 34099 | Not tested |
| CE2 | 0.330 | Not tested | Not tested | Not tested |
| EX1 | 0.202 | 3459 | 20927 | 60 @ 132 |
| EX2 | 0.248 | 3038 | 23518 | 30 @ 132 |
| EX3 | 0.208 | 3099 | 29064 | 30 @ 132 |
| EX4 | 0.190 | 3065 | 29032 | 30 @ 135 |

What is claimed is:

1. A block copolymer having the general structure:

A[-L-B]$_n$ wherein n is at least 1,
   A is a polyorganosiloxane block,
   B is a polyolefin block comprising a polypropylene homopolymer or copolymer, and
   L is a divalent linking group comprising the reaction product of an amine or alcohol and an anhydride; and
   wherein the block copolymer comprises at least 40 wt-% of polyorganosiloxane.

2. The block copolymer of claim 1 wherein the polyolefin block has a melt point of at least 110° C.

3. The block copolymer of claim 1 wherein the polypropylene copolymer comprises repeat units derived from saturated alkylenes and unsaturated alkenes having 4 to 12 carbon atoms.

4. The block copolymer of claim 1 wherein the block copolymer comprises at least 40 wt-% of polyolefin.

5. The block copolymer of claim 4 wherein the block copolymer has a coefficient of friction of less than 0.30.

6. The block copolymer of claim 1 wherein the block copolymer is a diblock copolymer having the formula:

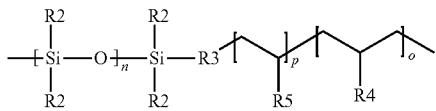

wherein R2 is hydrogen, C1-C6 alkyl or nitrile;
n is greater than 1,
R3 is the reaction product of an amine or hydroxyl functional group and an anhydride functional group;
p is at least 5;
for each p, R5 is independently hydrogen or methyl;
R4 is a C1-C8 alkylene or alkene; and
o is zero or greater than 1.

7. The block copolymer of claim 6 wherein R3 independently has one of the following structures:

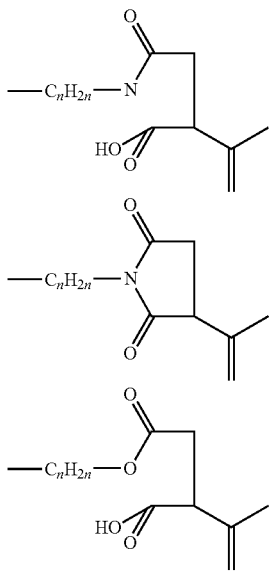

wherein n is an integer from 1 to 10.

8. The block copolymer of claim 6 wherein o is zero.

9. The block copolymer of claim 6 wherein o is at least 1 and R4 is a C1-C8 alkylene.

10. The block copolymer of claim 1 wherein the block copolymer is a triblock copolymer having the formula:

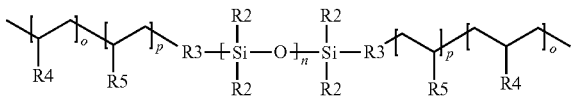

wherein R2 is hydrogen, C1-C6 alkyl or nitrile;
n is greater than 1,
R3 is the reaction product of an amine or hydroxyl functional group and an anhydride functional group;
p is at least 5;
for each m, R5 is independently hydrogen or methyl;
R4 is a C1-C8 alkylene or alkene; and
o is zero or greater than 1.

11. The block copolymer of claim 10 wherein R3 independently has one of the following structures:

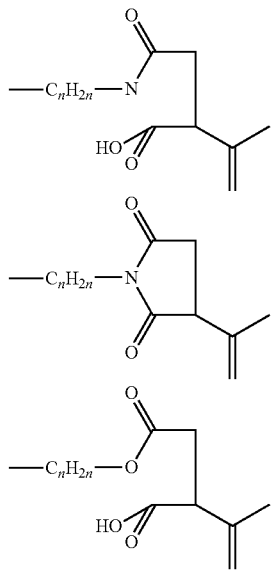

wherein n is an integer from 1 to 10.

12. The block copolymer of claim 10 wherein o is zero.

13. The block copolymer of claim 10 wherein o is at least 1 and R4 is a C1-C8 alkylene.

14. A grafted copolymer having the formula:

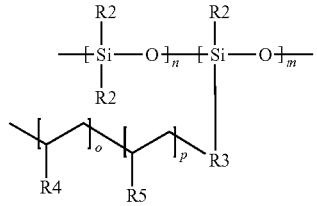

wherein R2 is hydrogen, C1-C6 alkyl or nitrile;
n is greater than 1,
m is at least 1,
R3 is the reaction product of an amine or hydroxyl functional group and an anhydride functional group;
p is at least 5;
for each m, R5 is independently hydrogen or methyl;
R4 is a C1-C8 alkylene or alkene; and
o is zero or greater than 1;and
wherein the block copolymer comprises at least 40 wt-% of polyorganosiloxane.

15. The block copolymer of claim 14 wherein R3 independently has one of the following structures:

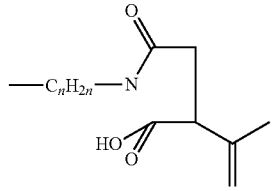

-continued
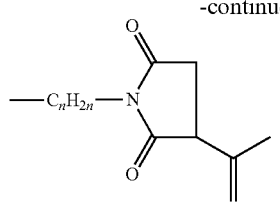
wherein n is an integer from 1 to 10.
16. The block copolymer of claim 14 wherein o is zero.
17. The block copolymer of claim 14 wherein o is at least 1 and R4 is a C1-C8 alkylene.
* * * * *